(12) United States Patent
Kowles et al.

(10) Patent No.: US 10,719,459 B2
(45) Date of Patent: Jul. 21, 2020

(54) COMMAND SPLITTING FOR HIGH-COST DATA ACCESS OPERATIONS

(71) Applicant: Seagate Technology LLC, Cupertino, CA (US)

(72) Inventors: Andrew Michael Kowles, Lyons, CO (US); David Andrew Rice, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 227 days.

(21) Appl. No.: 15/823,143

(22) Filed: Nov. 27, 2017

(65) Prior Publication Data

US 2019/0163651 A1 May 30, 2019

(51) Int. Cl.
- G06F 13/16 (2006.01)
- G06F 12/06 (2006.01)
- G06F 3/06 (2006.01)

(52) U.S. Cl.
CPC .......... G06F 13/1689 (2013.01); G06F 12/06 (2013.01); G06F 13/1631 (2013.01); G06F 13/1642 (2013.01)

(58) Field of Classification Search
None
See application file for complete search history.

(56) References Cited

U.S. PATENT DOCUMENTS

| | | | |
|---|---|---|---|
| 10,089,235 B1* | 10/2018 | Taylor | G06F 12/0246 |
| 2005/0273564 A1* | 12/2005 | Lakshmanamurthy | G06F 13/1694 711/158 |
| 2006/0036817 A1* | 2/2006 | Oza | G06F 9/3816 711/155 |

FOREIGN PATENT DOCUMENTS

JP 08195030 A * 7/1996

* cited by examiner

Primary Examiner — Michael Alsip
(74) Attorney, Agent, or Firm — Holzer Patel Drennan

(57) ABSTRACT

A method for improving write throughput of a storage device includes receiving a data access command targeting an LBA extent and determining that logical execution of the data access command includes reading or writing data logically across an identified high-performance-cost boundary. Responsive to the determination, the data access command is split into two or more separate data access commands that are separately queued in memory for execution.

17 Claims, 5 Drawing Sheets

COMMAND SPLITTING FOR HIGH-COST DATA ACCESS OPERATIONS

BACKGROUND

In data storage devices, a number of factors contribute to system delays in data access. In hard drive assemblies, for example, delays may be attributable to movement of the transducer head from one radial position to another, mode changes of solid state devices, fine position adjustments to ensure correct track alignment, re-loading of write current parameters to different pre-stored values, device-initiated calibrations, rotational latency (e.g., time spent "waiting" for a target data sector to rotate under the transducer head), etc. Due to various identifiable storage characteristics such as target storage location(s), read and write parameters associated with different locations, and data access rules, some types of data access operations may encounter delays that are more significant than others.

SUMMARY

Implementations disclosed herein provide systems and methods for improving write throughput of a storage device by splitting and separately executing certain access commands identified as having an associated high-performance cost. According to one implementation, a method includes receiving a data access command targeting an LBA extent and determining that logical execution of the data access command includes reading or writing data logically across an identified high-performance-cost boundary. Responsive to the determination, the data access command is split into two or more separate data access commands that are separately queued in memory for execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
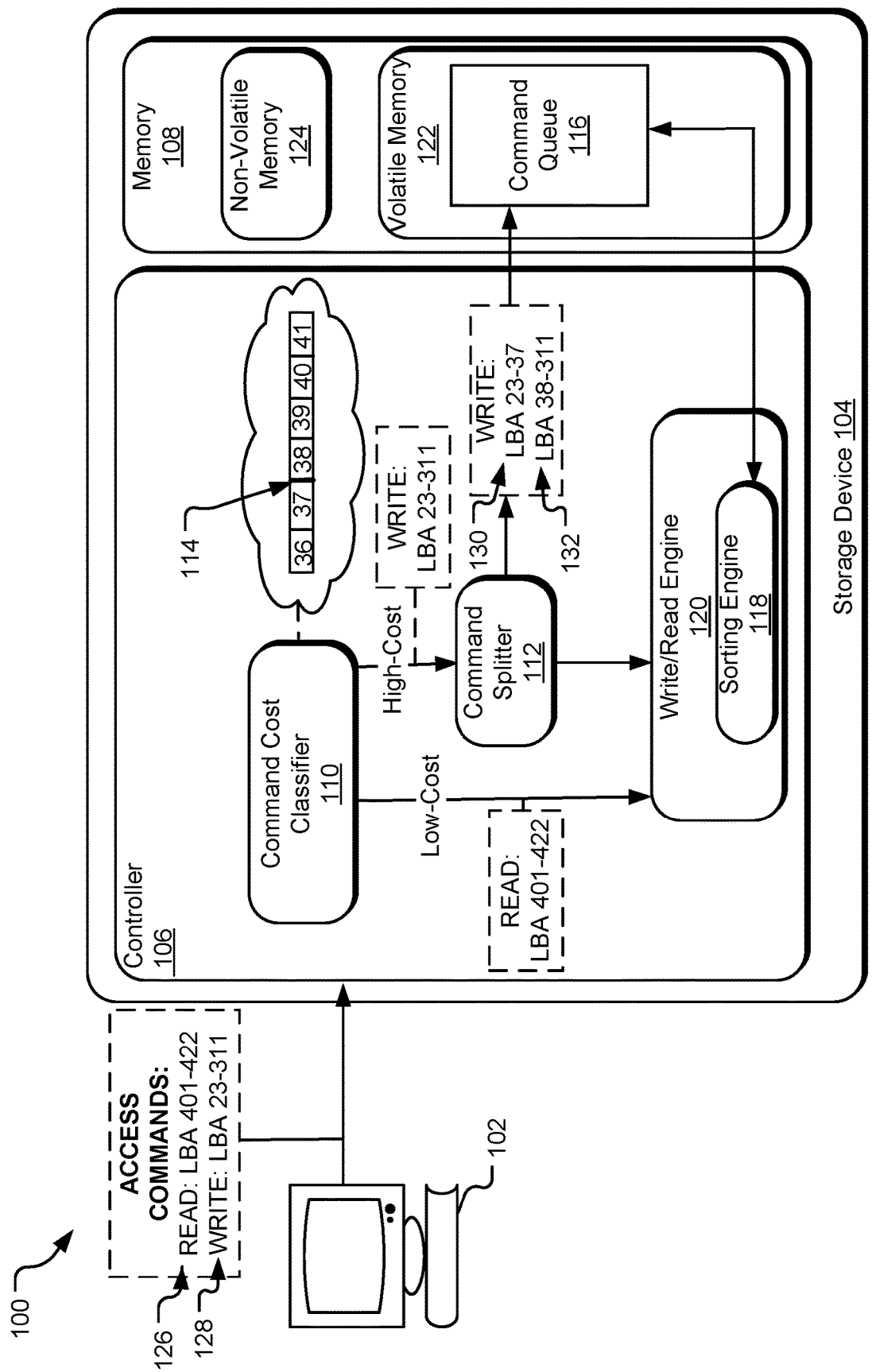
FIG. 1 illustrates an example data storage system that performs command splitting actions to reduce performance degradation attributable to certain high-cost data access operations.

FIG. 1 illustrates an example data storage system 100 that performs command splitting actions to reduce performance degradation attributable to certain "high-cost" data access operations. The data storage system 100 includes a storage device 104 including at least a controller 106 and memory 108 having a tangible computer-readable storage media, which can store data in sequential units (e.g., cells or data blocks) that are accessible by a computer, such as a host device 102. As used herein, the term "tangible computer-readable storage media" includes, but is not limited to, RAM, ROM, EEPROM, solid state memory (e.g., flash memory), CDROM, digital versatile disks (DVD) or other optical disk storage, magnetic cassettes, magnetic tape, magnetic disk storage or other magnetic storage devices, or any other medium that is a tangible article of manufacture usable to store the information that can accessed by a computer. In contrast to tangible computer-readable storage media, intangible computer-readable communication signals may embody data resident in a modulated data signal, such as a carrier wave or other signal transport mechanism.

The controller 106 includes a processor and software that provides top-level control of the storage device 104. The controller 106 is configured to read data from the memory 108, write data to the memory 108, control movement of a write/read head (if the storage device 104 includes a write/read head). In FIG. 1, the memory 108 is shown to include both volatile memory 122 and non-volatile memory 124. In various implementations, the non-volatile memory 124 may take on a variety of different forms including various forms including without limitation storage class memories, MRAM, Flash, and magnetic disk storage. Similarly, the volatile memory 122 may take on various forms including without limitation SRAM, DRAM, CAM.

The controller 106 interprets signals received from a host computer 102 as data access commands and controls circuitry of the storage device 104 to execute the data access commands. As used herein, a 'data access command' is a command that results in an operation that includes access to or alteration of data stored in the non-volatile memory 124, such as by reading data from, writing data to, or erasing data on the non-volatile memory 124.

In general, the controller 106 manages a physical mapping of host logical block addresses (LBAs) to physical blocks, which may be referred to in different implementations as physical block addresses (PBAs) or cells in the non-volatile memory 124 of the memory 108. In many systems, LBAs are initially mapped to physical data blocks in a consecutive LBA order that is also consecutive on physical data blocks. In some cases, however, consecutive LBA ranges are mapped to sequences of PBAs that are non-consecutive.

In one implementation, data access commands received from the host device 102 each individually define a consecutive LBA range (i.e., an LBA extent) of targeted LBAs on which a requested action is to be executed. A number of different factors may affect performance of the storage device 104 when such data access commands are executed. In FIG. 1, the controller 106 includes a command cost classifier 110 with logic for identifying a relative performance cost (e.g., a "high cost" or "low cost") of each incoming host-initiated data access command. The controller 106 implements different data management actions depending on whether the command cost classifier 110 determines that an incoming data access command is a low-cost data access command (e.g., a command executable with a relatively small margin of delay) or a high-cost data access command (e.g., executable with a relatively high margin of delay).

As used herein, the term "high cost data access command" refers to a read, write, or erase command targeting an LBA extent (a consecutive LBA sequence) for which the data storage device 100 is unable to execute without writing or reading data across a high-performance-cost boundary. As used herein, a high-performance-cost boundary refers to a boundary between two logically-ordered (LBA-consecutive) data blocks for which sequential access (e.g., writing, reading) to the LBA extent, according to normal drive access rules, causes the storage device 104 to incur a delay in excess of the predetermined delay threshold. For example, the storage device 104 may 'pause' after reading or writing data of a first part of a targeted LBA sequence and take action to prepare for reading or writing data of a second part of the targeted LBA sequence. For example, the storage device 104 may pause waiting for solid state components to thermally expand or contract, to perform processing work, re-position moving device components, or to reset/reload certain device parameters.

In one implementation, a command cost classifier 110 assesses the presence of different high-cost-indicators to determine whether a targeted LBA extent includes two data blocks separated by a high-performance-cost boundary. Since there exist a variety of different factors that may cause delays during execution of read and write commands, there also exist a variety of different conditions that may collectively or independently signify the presence of a high-performance-cost boundary within a targeted LBA extent. High-cost indicators may, for example, include consecutive LBAs mapped to disparate regions of a storage media or requiring different modes of operation by electromechanical or solid-state components, various combinations of storage device component settings saved in association with targeted storage locations, and/or other means of predicting a likelihood and/or magnitude of delays in data access.

In one implementation where the non-volatile memory 124 includes magnetic disk storage, the command cost classifier 110 identifies a high-performance-cost boundary by determining whether there exist any consecutive LBAs in a targeted LBA sequence that correspond to non-contiguous and/or non-consecutive physical data blocks. When, for example, a read or write entails a long distance, high velocity seek of the actuator arm other than a normal, short, low velocity "switch" to an adjacent track, latencies in data access to complete to operation may result. Rotational latencies (e.g., the time that a transducer head "waits" for a target block to rotate under a head following the completion of a seek) can also contribute to delays in data access. For these reasons, a "high-performance-cost boundary" may, in some implementations, correspond to a logical boundary between consecutive LBAs specified by a read or write command that are mapped to non-adjacent and/or non-contiguous physical data blocks.

In still another implementation, the command cost classifier 110 identifies a high-performance-cost boundary by assessing write/read settings such as write/read parameters associated with different physical storage regions targeted by the LBA extent specified in a data access command. When a data access operation targets physical blocks that correspond to different write/read settings, the controller 106 may "pause" mid-way through execution of the data access command to re-load an appropriate new value or set of values. For example, the controller 106 may adaptively load one or more write/read parameters after reading or writing a first portion of an LBA sequence and prior to reading or writing data of a second, latter portion of the LBA sequence.

Write/read settings include without limitation write current settings (e.g., amplitude, overshoot, rise time), settings designating a write/read head in association with a particular storage area, energy source settings (e.g., in energy-assisted magnetic storage devices), fly height, and recording mode (e.g., interlaced magnetic recording, shingled magnetic recording).

Some storage devices associate different write current settings with different storage areas. Adaptive re-loading of write current settings can contribute to delays in data access. For example, fly height changes may be achieved by thermally contracting or expanding the transducer in proportion to the characteristics of the materials of the device. Additionally, if the storage device 104 is an energy-assisted magnetic recording device (e.g., heat-assisted magnetic recording (HAMR) device or microwave-assisted magnetic recording (MAMR)), emitter power/frequency may be adaptively increased or decreased to alter an effective write track width. This alteration can contribute to delays in data access. Still other non-HAMR devices utilize different writers (rather than variable heat source power) or different write heater currents to achieve variable track width, for example by changing fly height. In these devices, extra "settling time" may be observed when seeking between tracks of different width to position the head over the new target data track and to adjust to the new fly height. Thus, extra settling time, parameter re-loading, fly height changes, and emitter frequency changes are all example effects that may increase delays in data access. For this reason, the command cost classifier 110 may determine that an LBA boundary is a "high-performance-cost boundary" if the boundary corresponds to such adaptive change in a write or read settings.

In still other implementations, the command cost classifier 110 determines that logically-consecutive data blocks are separated by a high-performance-cost boundary when predictive calculations indicate that device performance can be improved by parsing the command at an identified logical "split" boundary (e.g., at the high-performance cost boundary). For example, the command cost classifier 110 may assess the size of the data write and the data rates of available non-volatile storage devices to conclude writing a data segment contiguously to one storage medium takes longer than splitting the data segment into different segments and writing those different segments simultaneously to different storage media. In this case, the command cost classifier 110 may identify a high-performance-cost boundary as a logical split point in a data sequence that is determined to yield highest throughput when the resulting segments are transmitted to different receiving devices.

Notably, the act of parsing a data access command into multiple commands can itself add time some computation time. Since the host device 102 expects the controller 106 to send a command completion confirmation for a single command, the controller 106 may take action to track execution of the multiple (split) commands so the host can be informed at a time when all of these commands have been executed. As a result, the command cost classifier 110 may, in some implementations, perform a predictive calculation to determine whether a predicted increase in computation time (e.g., the time to split the command into two separate write commands) is sufficiently negated by a predicted net increase in write input/output operations per second (IOPS) during writing of the associated data and/or over a given period of time spanning the writing of such data, such as a time period during which several queued write commands are executed. For example, a 3% increase in computation time to split a command into multiple commands may be deemed acceptable in a tradeoff to increase write input/output operations per second (IOPS) by 8%.

In another implementation, the command cost classifier 110 estimates a predicted execution time for each incoming command to determine whether a targeted LBA extent includes two data blocks separated by a high-performance-cost boundary. For example, the command cost classifier 110 classifies an incoming command as a high cost data access command when the predicted execution time exceeds a predetermined delay threshold. The predetermined delay threshold used in determining whether a data access command is high-cost or low-cost may vary considerably from one implementation to another depending, for example, upon the type of non-volatile memory 124 included, the data management schemes employed, and the product design performance objectives. In one implementation where the storage device 104 includes magnetic disk storage, the delay threshold is about 25% or more of a total track revolution time. In another implementation, the delay threshold is 100% or more of a total track revolution time.

In some implementations, the command cost classifier 110 assesses a predicted write throughput to determine whether logically-consecutive data blocks are separated by a high-performance-cost boundary. If, for example, the command cost classifier 110 determines that the write completion time is expected to marginally increase beyond a predetermined threshold when a command is executed, the command is classified as a high-cost command.

The above-described examples of high-performance-cost boundaries are exemplary, but non-exhaustive. Some of these examples are further explored with respect to FIGS. 2-4, below.

In the example of FIG. 1, a host device 102 sends a first data access command 126 and a second data access command 128 sequentially to the storage device 104. The command cost classifier 110 evaluates the first data access command 126, which is a request to read data to LBAs 401-422. The command cost classifier 110 assesses various high-cost indicators such as the locations of targeted physical data blocks relative to one another, write/read settings associated with each of the targeted physical data blocks, and recording modes associated with each targeted storage location. Based on such assessment, the command cost classifier 110 determines that the first data access command 126 is a low-cost command that is executable without crossing a high-performance-cost boundary.

Responsive to the determination that the first data access command 126 is a low-cost command, the command cost classifier 110 provides a write/read engine 120 with instructions for executing the command, such as instructions to execute the command at the next available time. In one implementation, the write/read engine 120 executes the command without waiting for the controller 106 to perform any additional processing actions.

Following execution of the first data access command 126, the host device 102 transmits the second data access command 128 to the controller 106. The second data access command 128 is a request to write data of LBAs 23-311. Responsive to receipt of the second data access command 128, the command cost classifier 110 again assesses various high-cost indicators such as the locations of targeted physical data blocks relative to one another, write/read settings associated with each of the targeted physical data blocks, and recording modes associated with the various targeted storage locations.

The command cost classifier 110 determines that the targeted LBA sequence 23-311 includes at least two consecutive LBAs for which consecutive physical access includes writing data across a high-performance-cost boundary 114 and, consequently, classifies the second data access command 128 as a high-cost command.

In the illustrated example, the command cost classifier 110 identifies the high-performance-cost boundary 114 between LBAs 37 and 38. In one implementation, the LBAs 37 and 38 correspond to data blocks on a magnetic storage media that are physically remote from one another. In another implementation, the LBAs 37 and 38 correspond to storage locations that correspond to different write/read settings, such as settings that the controller 106 alters (e.g., re-loads) after writing LBA 37 but prior to writing LBA 38. In still other implementations, the LBAs 37 and 38 represent data blocks that the controller 106 is capable of writing more efficiently when written piece-wise, as two separate commands (e.g., at different times or simultaneously along different data channels different media) than in a single data access command.

Responsive to the determination that the second data access command 128 is a high-cost data access command, the command cost classifier 110 provides the second data access command 128 to a command splitter 112 for a splitting operation along with the location of the identified high-performance-cost boundary 114 (or multiple locations in the event that multiple high-performance-cost boundaries are identified). The command splitter 112, in turn, splits the targeted LBA extent at the identified high-performance-cost boundaries into smaller consecutive LBA subsets (e.g., 23-37 and 38-311), and transforms the second data access command 128 into multiple data access commands that are each associated with a different one of the segmented portions of the LBA extent. The multiple data access commands may then be independently queued (e.g., in a command queue 116) and executed.

In FIG. 1, the command splitter 112 parses the second data access command 128 at the identified high-performance-cost boundary 114 (between the LBAs 37-38) and thereby transforms the second data access command 128 into two separate write commands 130 and 132 that can be independently queued and executed. As a result, the read command targeting LBAs 23-311 is divided into a first read command 130 targeting portion of the targeted LBA sequence in front of the high-performance-cost boundary 114 (e.g., a read command targeting LBAs 23-37) and a second read command 132 targeting a second portion of the targeted LBA sequence following the high-performance-cost boundary 114 (e.g., a read command targeting LBAs 38-311).

The two resulting read commands (130 and 132) are separately queued for execution. As a result, the two commands can be executed in any order relative to one another and relative to other commands in the queue. For example, a first of the two or more resulting commands may be placed at the beginning of the queue for immediate execution and a second of the resulting commands may be placed at a lower position in the queue for later execution. Separate execution of the two portions of the second data access command 128 improves performance of the storage device 140 in a variety of ways discussed more specifically with respect to the following figures.

In one implementation, the write/read engine 120 includes a sorting engine 118 that manages the selection order for executing commands in the command queue 116 to ensure pending commands are executed in an order that mitigates total observed delays in data access. For example, the commands in the command queue 116 may be selected for execution in an order that is based on various performance-efficiency considerations such as mitigation of total seek time and/or maximization of write throughput. In one implementation, the sorting engine 118 selectively executes pending write commands such that sequential writes are performed on physical data blocks that are arranged consecutively or in close proximity to one another and/or an order that reduces a total number of times that the controller 106 pauses to perform various tasks such as to alter one or more write/read settings. In this sense, the splitting of identified high-cost data access commands into multiple commands allows different portions of each command to be executed entirely independent of one another and at times that allow for a greatest reduction in delays to data access. Various components of the controller 106, such as the command cost classifier 110, the command splitter 112, the write/read engine 120, etc., may be implemented using instructions stored on computer-readable media and executable on a computer processor.

Figure 2:
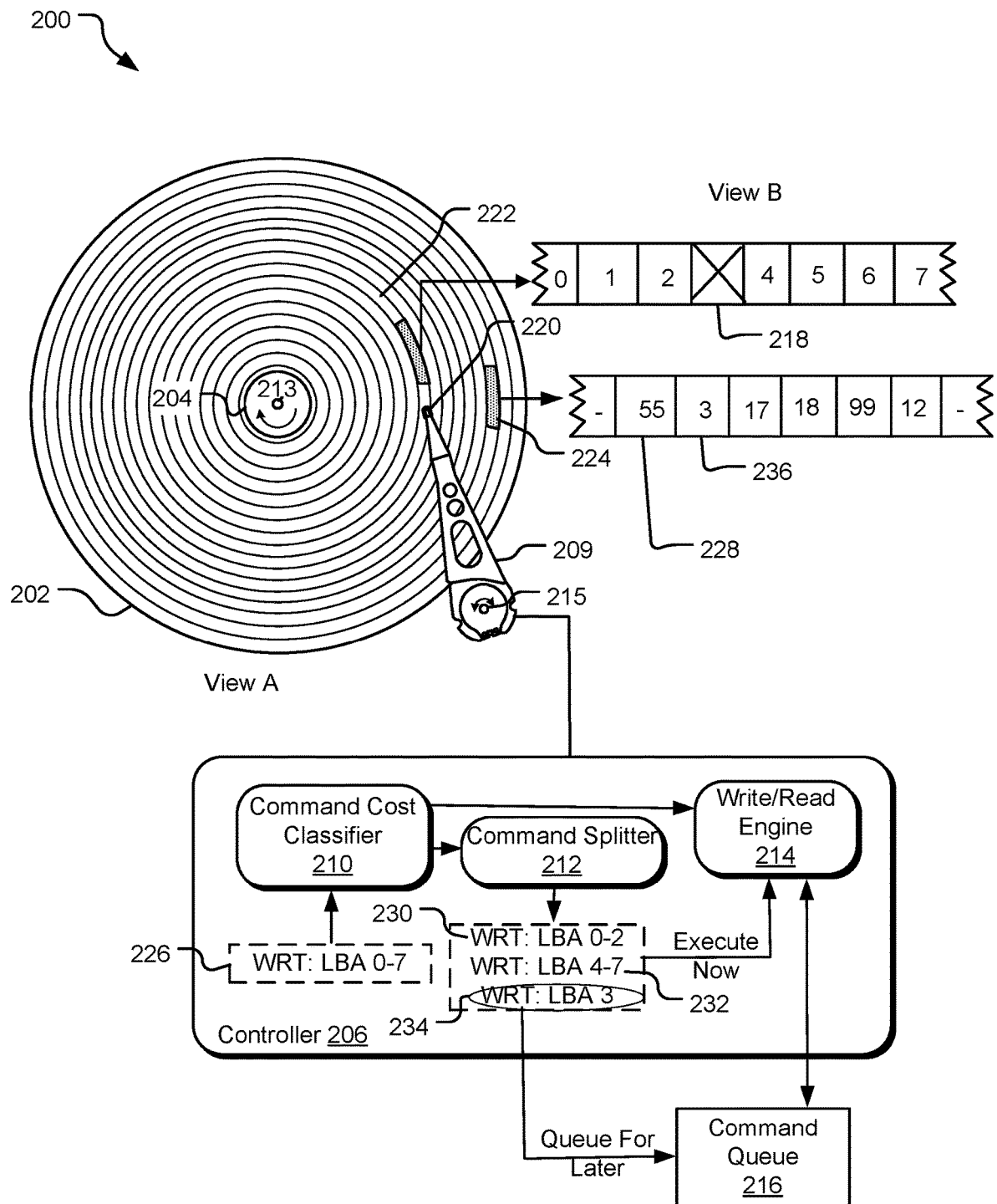
FIG. 2 illustrates one example data storage device that performs command splitting and re-queuing for identified high-cost data access commands.

FIG. 2 illustrates one example magnetic storage device 200 with a controller 206 that performs command splitting and re-queuing for identified high-cost data access commands. The magnetic storage device 200 includes a transducer head assembly 220 and a magnetic storage medium 208 that rotates about a spindle center or a disc axis of rotation 213 during rotation, and includes an inner diameter 204 and an outer diameter 202 between which are a number of concentric data tracks (e.g., a data track 222).

The transducer head assembly 220 is mounted on an actuator arm 209 at an end distal to an actuator axis of rotation 215 and is usable to read information from and write information to data bit locations in the data tracks on the magnetic storage medium 208. The transducer head assembly 220 flies in close proximity above the surface of the magnetic storage medium 208 during disc rotation. For each read and write operation of the magnetic storage device 200, the actuator arm 209 rotates about the actuator axis of rotation 213 to position the transducer head assembly 220 over a target data track. The transducer head assembly 220 includes at least one write element (not shown) including a write pole for converting an electrical signal sent from a controller 206 into a magnetic signal of commensurate length. The magnetic pulses of the write pole selectively magnetize magnetic grains of the rotating magnetic media 208 as they pass below the pulsating write element.

The magnetic storage device 200 further includes a controller 206 with logic for identifying a relative performance cost of each incoming host-initiated data access command, and for splitting identified high-cost commands into additional commands that may be separately queued and executed improve write throughput of the magnetic storage device 200. In FIG. 2, the controller 206 includes a command cost classifier 210, a command splitter 212, and a write/read engine 214. The command cost classifier 210 classifies incoming data access commands as high-cost or low cost and the command splitter 212 that splits each identified high-cost command into multiple separate commands. The write/read engine 214 manages a command queue 216 and executes pending data access commands according to an order specified by the command queue 216.

In the illustrated example, the command cost classifier 210 receives a data access command 226. Although the data access command 226 is shown to be a write command, the same or similar operational steps may be employed for a received write command. The data access command 226 targets an LBA extent (0-7), which corresponds to physical data blocks shown in greater detail in View B. Specifically, View B illustrates magnified portions of the data track 222 and of the data track 224. Numbers shown interior to each of the data tracks 222 and 224 indicate LBA mappings to the illustrated physical regions. As shown in View B, a data sector 218 on the data track 222 was initially mapped to LBA 3, but has been since identified as a defective sector. As a result, the controller 206 has re-mapped LBA 3 from the data sector 218 to an initially-spare sector (a data block 236), located within another data track 224. For example, the data track 224 was initially a spare track with multiple sectors that have, since drive initialization, been mapped to LBAs responsive to detection of defective sectors.

When implementing normal write rules, the controller 206 logically writes all data corresponding to the targeted LBA extent (0-7) before moving on to any other commands pending in the command queue 216. In the illustrated example, execution of the data access command 226 includes a "mid-command" seek the transducer head assembly 220 between data track 222 and 224. In one implementation, data of LBAs 0-2 and 4-7 is written first on the data track 222 and a single seek is subsequently performed to re-position the transducer head assembly 220 over the data track 224 to write data of LBA 3. In another implementation, the execution of the data access command 226 includes execution of two seek commands, such as to write the data of LBAs 0-2, seek to position the transducer head assembly 220 to write to LBA 3, and then seek again to re-position the transducer head assembly 220 to write LBAs 4-7. This mid-command seeking can significantly reduce write throughput, particularly if the controller 206 routinely executes a large number data access commands targeting LBA extents that logically span non-consecutive data blocks.

In FIG. 2, the command cost classifier 210 determines that normal execution of the data access command 226 includes writing data across at least one high-performance-cost boundary (e.g., the logical boundary between LBAs 2 through 3 or 3 through 4). Responsive to such determination, the command cost classifier 210 identifies split points within the LBA sequence (e.g., between LBA 2 and 3 and between LBAs 3 and 4), and splits the data access command into three separate commands, each targeting a different logical segment of the LBA sequence.

The command splitter 212 outputs three commands: a first data access command 230 for performing the write of LBAs 0-2; a second data access command 232 for performing the write of LBAs 4-7; and a third command 234 for performing the write of LBA 3. Each of the three commands output by the command splitter 212 is a separate command that can be separately placed in the command queue 216 and selected and executed independent of execution of the other two commands, and independent of other commands pending in the command queue 216.

The write/read engine 214 receives the three commands output by the command splitter 212 and queues the commands separately for execution. In one implementation, the command splitter 212 provides the write/read engine 214 with a specified order for executing the commands relative to one another and/or other commands in the queue. For example, the command splitter 212 may determine that it is more efficient to write LBAs 0-2 and 4-7 now, and to write LBA 3 later, such as at a time when the controller 206 is writing data to other sectors in the data track 224. In this case, the command splitter 212 may provide the write/read engine 214 with an instruction to execute that the first data access command 230 and the second data access command 232 next, before executing any other commands in the command queue 216. The write/read engine 214, in turn, places these commands at the front of the command queue 216 and executes them without delay.

Continuing the above example, the command splitter 212 provides the write/read engine 214 with a request to queue the third command 234 at a more efficient time for later execution. In some implementations, the write/read engine 214 is instructed to determine an order of execution for the third command 234 relative to commands already existing in the command queue 216 based on performance-efficiency considerations. In one implementation, the write/read engine 214 determines an execution order for the third command 234 relative to other data commands in the command queue 216 at a time when the third command 234 is initially placed in the command queue 216. In another implementation, the write/read engine 214 dynamically determines an execution order for commands in the command queue 216. For example, the write/read engine 214 dynamically selects each queued command for execution based on various performance-efficiency considerations.

In one implementation, the command queue 216 selects a command execution of the queued commands based on the positions of the corresponding targeted physical blocks. For example, the write/read engine 214 may determine that the third command 234 is to be selected for execution from the command queue 234 at a time that is directly before or after execution of other queued data access command(s) targeting physical blocks that are physically proximate to the data block 236 (mapped to LBA 3). As a result, the third command 234 may be executed in sequence with other pending commands targeting physical blocks in a same region. This arrangement of commands in the command queue 216 may have the effect of mitigating net seek and/or settle time over the course of execution of all commands in the command queue 216.

Figure 3:
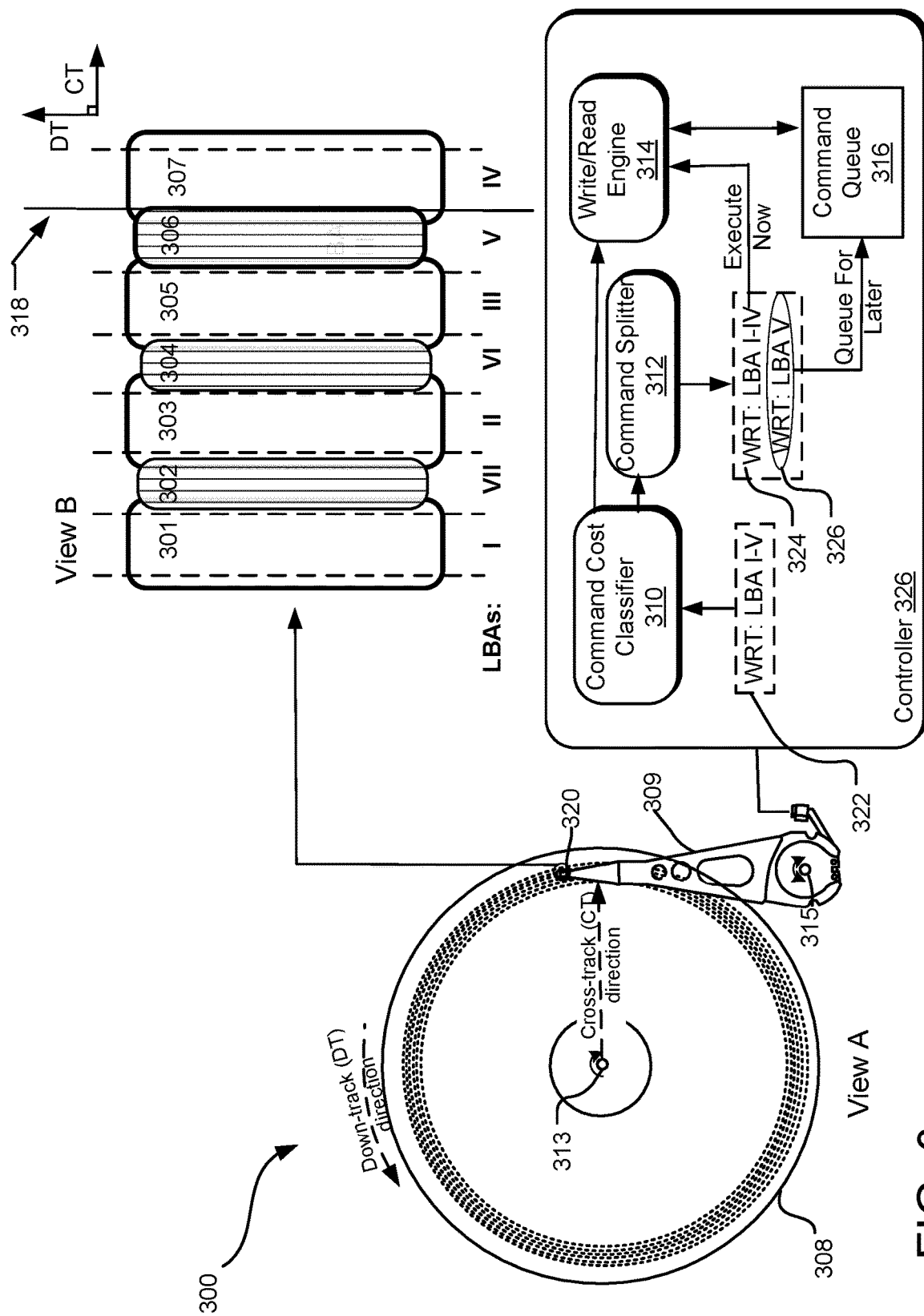
FIG. 3 illustrates aspects of another example data storage device that performs command splitting and re-queuing for identified high-cost data access commands.

FIG. 3 illustrates aspects of another example data storage device 300 (e.g., a hard drive disk assembly) with a controller 326 that performs command splitting for identified high-cost data access commands.

The controller 326 sends control signals to a transducer head assembly 320 to read data from and write data to a magnetic storage medium 308. Although not shown, the transducer head assembly 320 includes at least a write element for recording data bits on the storage medium 308 and also a read element for reading data from the magnetic storage medium. As illustrated in View A, the transducer head assembly 320 is mounted on an actuator 309 at an end distal to an actuator axis of rotation 315, which is rotated to position the transducer head assembly 320 over a target data track on the magnetic storage medium 308 that is rotated about a spindle center or a disc axis of rotation 313.

A controller 326 of the data storage device 300 implements an interlaced magnetic recording (IMR) data management technique. IMR refers to a storage technique that utilizes different written track widths when writing alternating data tracks on a magnetic disk. For example, magnified View B shows a grouping of data tracks 301-307, including data tracks of two different written track widths. A first series of alternating data tracks (e.g., data tracks 301, 303, 305, and 307), commonly referred to as "IMR bottom tracks" have wide written track width as compared to a second series of alternating data tracks (e.g., data tracks 302, 304, and 306), which are commonly referred to as "IMR top tracks." Data tracks of the second series are each positioned with edges to overlap edges of previously-written adjacent tracks of the wider track width. For example, the data track 302 has edges that overlap edges of the data tracks 301 and 303.

In IMR systems, the controller 326 implements track progression write rules designed to prevent data corruption on the IMR top tracks (e.g., data tracks 302, 304 and 306) when filling a radial zone with data. In one implementation, the track progression rules prohibit data from being written to a narrow (top) IMR track until data is first written to the two directly-adjacent wider (bottom) data tracks. For example, no data is written to the data track 302 until after data is first written to the immediately adjacent data tracks 301 and 303. Different IMR systems may fill tracks in a radial zone differently while still complying with the same track progression write rules. For example, one IMR write scheme may direct data to a radial zone of the magnetic storage medium 208 by writing each of the IMR bottom tracks 301, 303, 305, and 307 before writing data to any IMR top tracks in the radial zone. In another implementation, the zone is filled by alternating writes between top and bottom tracks such as according to the track write order: 301, 303, 302, 305, 304, 307, 306.

When filling a radial zone with data according to the above-described techniques, transducer head assembly 320 is moved to perform at least one interlayer seek. As used herein, the term "interlayer seek" refers to a seek of the transducer head assembly 320 from a data track of one written width to a position to access another data track of a different written width, such as a seek from between an IMR top track and an IMR bottom track.

Interlayer seeks are the slowest seeks, much slower (e.g., approximately 10× slower) than seeks between data tracks of the same layer (e.g., between two IMR top tracks or two IMR bottom tracks). When, for example, the actuator arm 309 moves the transducer head from an IMR bottom track to an IMR top track, additional performance delays are incurred as compared to track seeks between data tracks of equal track width. One factor decreasing performance efficiency in interlayer seek operations is a recording mode alteration and associated "work" performed by the storage device to change the write track width of the transducer head assembly 320. If, for example, the data storage device 300 is an energy-assisted magnetic recording device (e.g., HAMR or MAMR), an emitter frequency (MAMR spin torque oscillator) or power (HAMR laser) may be altered to increase or decrease the corresponding written track width. Switching between high and low energy source settings takes some amount of time that is non-trivial. Also, in some non-HAMR devices, write current parameters (e.g., amplitude, overshoot, and rise time) are altered to selectively vary the written track width by adjusting the fly height simply by thermally expanding or contracting the transducer structure itself, which takes some nonzero time. Collectively, write heater current parameters and write heater current settings are referred to herein as "write/read settings." Changing or re-loading write/read settings during a data access operation can cause noticeable delays in data access. Still other types of storage devices utilize different writers to achieve variable track width. In these devices, extra "settling time" may be observed when seeking between tracks of different width to position a new writer element over the target data track. This settling time, also sometimes referred to as 'microjog', can also reduce performance of the data storage device 300.

As a result of the above-described conditions, write commands that include few or no interlayer seeks can generally be implemented with less delay than write commands that include one or multiple interlayer seeks. The data storage device 300 includes logic for splitting write commands that include interlayer seeks into separate commands that can individually be executed without performing any interlayer seeks. These separate commands can be queued and/or selected for execution in an order that improves net performance of the data storage device 300.

In the illustrated example, the controller 326 includes a command cost classifier 310 that classifies incoming write commands as "high cost" or "low cost." For each received write command, the command cost classifier 310 evaluates target storage locations and determines the number of interlayer seeks performed (e.g., the number of high-performance-cost boundaries "crossed") during execution of the command. When the command cost classifier 310 determines that a received write command can be executed without performing any interlayer seeks, the command is classified as a low-cost command, placed at the beginning of a command queue 316, and provided to a write/read engine 314 for execution. When, however, the command cost classifier 310 determines that execution of a write command includes at least one interlayer seek, the write command is classified as a "high cost" command and the write command is provided to a command splitter 312 along with logical split points identifying locations of one or more high-performance-cost boundaries within a targeted LBA extent. The command splitter 312, in turn, splits the write command into two or more individual write commands that can each be separately queued and executed without performing an interlayer seek of the transducer head assembly 320.

In the illustrated example, the command cost classifier 310 receives a write command 322 targeting an LBA extent I-V where I, II, III, IV, and V each represent consecutive ranges of LBAs mapped to different tracks, as shown. When the LBA groups I-V are written according in consecutive LBA order, data is directed sequentially to the consecutive IMR bottom tracks 301, 303, 305, and 307 followed by a write to a top IMR data track 306.

The command cost classifier 310 determines that the seek between the data tracks 307 and 306 is an interlayer seek triggering a change in write/read settings to vary the written track width. As a result, the command splitter 312 identifies a high-performance-cost boundary 318. The command splitter 312 splits the write command 322 into two different write commands targeting LBA extents on different sides of the high-performance-cost boundary 318. The command splitter 312 outputs a first write command 324 targeting a first subset of the targeted LBA sequence (LBAs I-IV) and a second write command 326 targeting a second subset of the targeted LBA sequence (LBA V).

The write/read engine 314 elects to execute the first command 324 at the time it is received. Data of LBAs I-IV is written to the data tracks 301, 303, 305, and 307, sequentially. The write/read engine 314 places the second write command 326 in a command queue 316 for later execution.

In one implementation, the write/read engine 314 selectively positions the second write command 326 at a position in the command queue 316 based on performance-efficiency considerations, such as to effect a net decrease in total command completion time for writing data specified by a collection of write commands pending in the command queue 316 as compared to the total command completion time for writing the same data according to traditional write methodology (e.g., without splitting any incoming write commands and/or according to an execution order determined based on an order of command receipt).

For example, the command queue 316 may group together data access commands based on track width of a target location and/or based on an arrangement of tracks targeted by the various commands in the command queue 316. In one implementation, the write/read engine 314 selectively executes pending of the command queue 316 such that commands targeting IMR top tracks are performed sequentially and at a time that is separate from a sequential execution of the commands targeting IMR bottom tracks, thereby maximizing the time that a same set of write/read settings are used in any one instance. This, in turn, mitigates or eliminates that number of interlayer seeks that are performed during execution of commands in the command queue 316 and improves aggregate random IO performance of the device.

Figure 4:
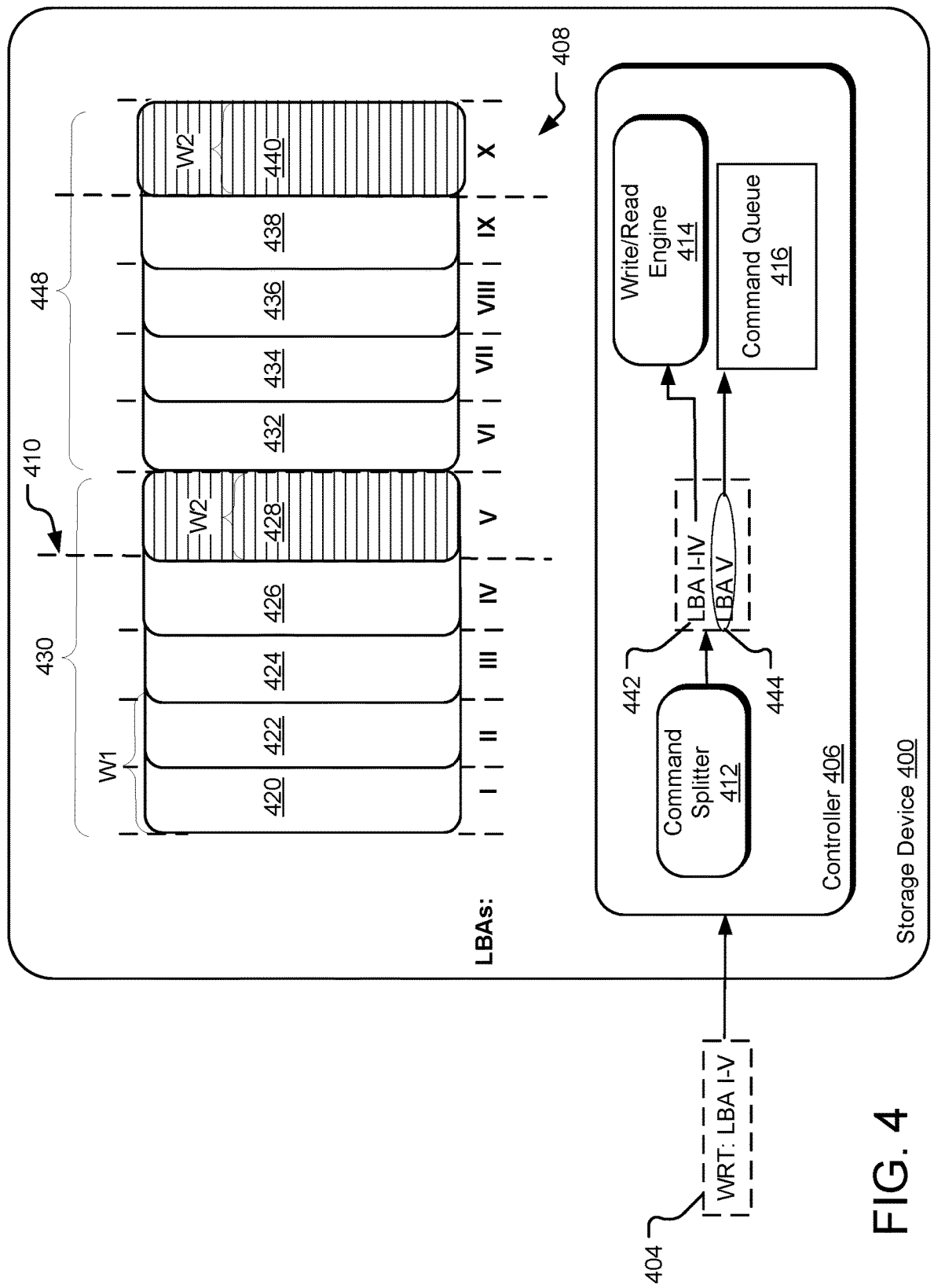
FIG. 4 illustrates aspects of still another example data storage system that performs command splitting and re-queuing for identified high-cost data access commands.

FIG. 4 illustrates aspects of another example data storage device 400 including a controller 406 that performs command splitting and re-queuing for identified high-cost data access commands. The data storage device 400 includes a magnetic storage media 408. Although not shown in FIG. 2, the circuitry and components for reading and writing data may be similar in purpose and operation to that described with respect to the data storage device 400 of FIG. 4.

In FIG. 4, a controller 406 of the storage device reads and writes data according to a shingled-magnetic recording (SMR) write scheme. In SMR, a write element is configured to magnetize an area corresponding to a written track width W1, which is larger than a nominal track pitch (e.g., center-to-center spacing between directly adjacent tracks). Data is managed in groupings of tracks referred to as data bands (e.g., SMR data bands 430 and 448). Within each of the SMR data bands 430 and 448, data tracks are arranged in an overlapping format such that a final effective width of each written data track is narrower than the written track width (e.g., the area initially magnetized by a pass of a write element). To prevent inadvertent track overwrite, track progression write rules provide for reading an entire data band into memory, updating the data band, and re-writing the data band in a consecutive track order whenever one or more cells in the data band are changed. For example, the data tracks of SMR band 1 are written in the following order: 420, 422, 424, 426, and 428.

In the illustrated data storage device 400, the controller 406 alters one or more device settings when writing to a last data track in a data band (e.g., the data tracks 428 and 440) so as to reduce the written track width of the last data track of the associated data band as compared to the other data tracks in the data band. For example, a data track 428 in the 422 has a written track width W2 that is smaller than the written track width W1 of each of the other data tracks in the same data band.

The above-described reduction in written track width (e.g., from W1 to W2) may be achieved in a variety of ways, such as those described above with respect to variable track widths in IMR systems. When the data storage device 400 performs the multi-layer seek to move the transducer head between the last two tracks of a data band (e.g., between the data tracks 426 of written width W1 and the data track 428 of written width W2), the storage device 400 may experience delays attributable to the changes in device settings (e.g., alteration of energy source power, re-loading of write current parameters) and/or switching of the current write element currently in-use.

In the illustrated example, the controller 406 includes a command splitter 412 that splits each SMR band re-write command into two different commands that can be executed at different times. For example, the command splitter 412 receives a host command 404 targeting an LBA extent I-V, where I, II, III, IV, and V each represent consecutive ranges of LBAs arranged on adjacent data tracks. The command splitter 412 recognizes that logical execution of this data access command includes writing data across a high-performance-cost boundary 410 since LBAs prior to this boundary are written at the track width W1 and LBAs following this boundary are written at the track width W2. Consequently, the command splitter 412 splits the incoming band write command at the high-performance-cost boundary 410, outputting first command 442 for writing data to LBA groups I-IV and a second command 444 for writing data to LBA group V.

A write/read engine 414 executes the first command 442 to write the LBAs of groups I-IV on the data tracks 420, 422, 424, and 426, respectively, and places the second command 444 in a command queue 416 for later execution. In one implementation, the write/read engine 414 selectively positions the second command 444 at a position in the command queue 416 that delivers highest write throughput during execution of pending commands. For example, the command queue 416 may group together commands targeting data tracks of the reduced track width (W2) so as to allow multiple of tracks at this width to be written in sequence, without pausing to adaptively alter write/read settings such as to alter an energy source power level or switch between write elements. This, in turn, mitigates the total number of interlayer seeks that are performed during execution of commands in the command queue 416.

Figure 5:
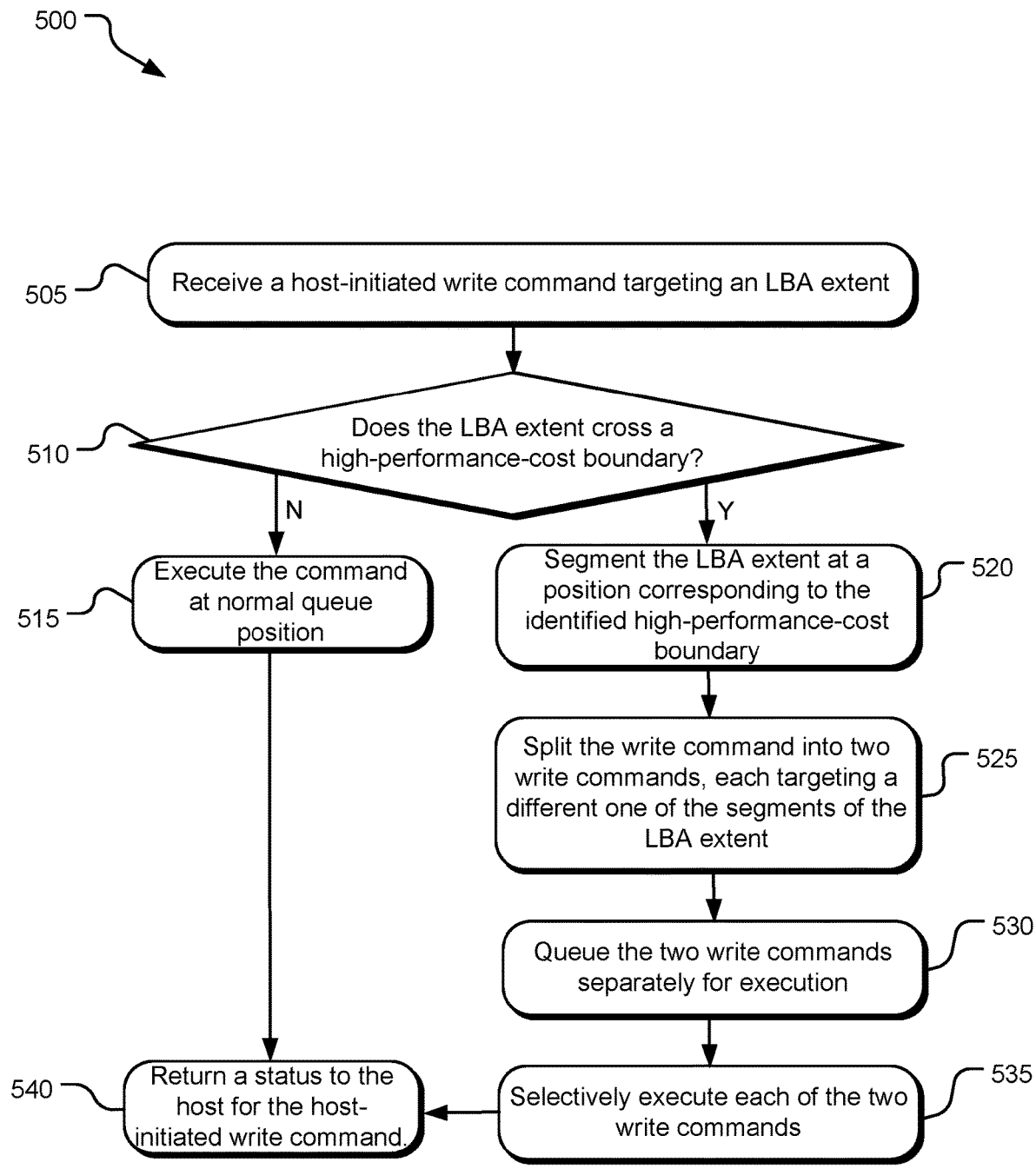
FIG. 5 illustrates example operations for identifying high-performance-cost data access commands and splitting such commands into multiple independently-executable commands.

FIG. 5 illustrates example operations 500 for identifying high-performance-cost write commands and splitting such commands into multiple independently-executable commands. A receiving operation 505 receives a host-initiated write command specifying a target LBA extent. A determining operation 510 determines whether the LBA extent crosses a high-performance-cost boundary by identifying physical locations associated with each LBA in the extent and device settings associated with each identified physical location. If, for example, writing two consecutive LBAs entails a large seek, the start location of the seek may be identified as the high-performance-cost boundary. If, alternatively, writing two consecutive LBAs of the LBA extent entails a mid-command change in device settings (such as to alter an effective write track width), the location corresponding to the device setting change is identified as the high-performance-cost boundary.

If the determination operation 510 does not identify any high-performance-cost boundaries within the LBA extent, an execution operation 515 executes the host-initiated write command normally, such as according to the queue position assigned based on the time of the receiving operation 505. Upon completed execution of the host-initiated write command, status provisioning operation 540 returns a status notifying the host of successful completion of the host-initiated write command.

If, however, the determination operation 510 does identify at least one high-performance-cost boundary within the LBA extent, a segmenting operation 520 segments the LBA extent at a position corresponding to the identified high-performance cost boundary, and a splitting operation 525 splits the host-initiated write command into two separate write commands, each targeting a different one of the segments of the LBA extent. In one implementation, the segmenting operation 520 and the splitting operation 525 are performed by a storage device controller and the host computer does not have access to information regarding the split. As a result, the host computer awaits confirmation of the original (single) host-initiated write command.

A queue placement operation 530 places the two write commands in the queue for separate execution. A selective execution operation 535 selectively executes each of the two write commands at different times determined based on performance-efficiency considerations such as the positions of target physical blocks, write/read settings associated with each physical block, and/or the speed at which data is expected to be transferred to the target physical locations. In one implementation, queued commands are selectively executed such that commands targeting similar LBA extents are executed in groups and/or such that commands associated with identical write read settings are executed in groups. For example, commands targeting data tracks of one track width may be grouped together and executed before a group of commands targeting data tracks of another data track width.

After both of the two write commands are executed, the status provisioning operation 540 returns a single status to the host to inform the host that execution of the host-initiated write command is now complete.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
  receiving a data access command targeting a logical block address (LBA) extent in a storage device;
  determining that execution of the data access command includes moving a read/write head across an identified high-performance-cost boundary, the high-performance cost boundary being between two logically-ordered data blocks for which sequential write access causes the storage device to incur a delay in excess of a predetermined delay threshold;
  splitting the data access command into two or more separate data access commands responsive to the determination;
  determining an execution order for the data access commands based on at least one performance-efficiency consideration;
  separately queuing the data access commands in memory for execution according to the determined execution order; and
  controlling the read/write, head to execute each of the queued data access commands.

2. The method of claim 1, wherein splitting the data access command into the two or more separate data access commands includes splitting the LBA extent at the identified high-performance-cost boundary and generating a first data access command to write data blocks associated with a first side of the identified high-performance-cost boundary and a second data access command to write data blocks associated with a second opposite side of the identified high-performance-cost boundary.

3. The method of claim 1, wherein the execution order is determined based on write/read settings associated with targeted physical blocks, the execution order mitigating a number of interlayer seeks.

4. The method of claim 1, wherein the execution order is determined based on positions of targeted physical blocks, the execution order mitigating total seek times observed during execution of a plurality of commands in the queued sequence.

5. The method of claim 1, wherein the high-performance-cost boundary is a logical boundary between two logical blocks corresponding to non-consecutive physical data blocks.

6. The method of claim 5, wherein one of the non-consecutive physical data blocks was initially a spare data block that was mapped to one of the two logical blocks responsive to detection of a defective physical data block.

7. The method of claim 1, wherein the identified high-performance-cost boundary is a logical boundary between two blocks corresponding to data tracks of different written track width.

8. A storage device comprising:
a storage medium;
a controller executable to:
receive a data access command targeting an LBA extent;
determine that execution of the data access command includes moving a read/write head across an identified high-performance-cost boundary, the high-performance cost boundary being between two logically-ordered data blocks for which sequential write access causes the storage device to incur a delay in excess of a predetermined delay threshold;
split the data access command into two data access commands each associated with logical blocks on an opposite side of the identified high-performance-cost boundary responsive to the determination;
determine an execution order for the two data access commands based on at least one performance-efficiency consideration,
separately queue the two data access commands in memory for execution according to the determined execution order; and
control the read/write head to execute each of the two queued data access commands.

9. The storage device of claim 8, wherein the controller determines the execution order based on write/read settings associated with targeted physical blocks, the execution order mitigating a number of interlayer seeks.

10. The storage device of claim 8, wherein the controller determines the execution order based on positions of targeted physical blocks, the execution order mitigating total seek times observed during execution of a plurality of commands in the queued sequence.

11. The storage device of claim 8, wherein the identified high-performance-cost boundary is a logical boundary between two logical blocks corresponding to non-consecutive physical data blocks.

12. The storage device of claim 11, wherein one of the non-consecutive physical data blocks was initially a spare data block that was mapped to one of the two logical blocks responsive to detection of a defective-physical data block.

13. The storage device of claim 8, wherein the identified high-performance-cost boundary is a logical boundary between two blocks corresponding to data tracks of different written track width.

14. One or more computer-readable storage media of a tangible article of manufacture encoding computer-executable instructions for executing on a computer system a computer process comprising:
receiving a data access command targeting an LBA extent in a storage device;
determining that execution of the data access command includes moving a read/write head across an identified high-performance-cost boundary, the high-performance cost boundary being between two logically-ordered data blocks for which sequential write access causes the storage device to incur a delay in excess of a predetermined delay threshold;
splitting the data access command into two or more separate data access commands responsive to the determination;
determining an execution order for the two or more separate data access commands based on at least one performance-efficiency consideration
separately queuing the two or more separate data access commands in memory for execution according to the determined execution order; and
controlling the read/write head to execute each of the queued data access commands.

15. The one or more computer-readable storage media of claim 14, wherein splitting the data access command into the two or more separate data access commands includes splitting the LBA extent at the identified high-performance-cost boundary and generating a first data access command to write data blocks associated with a first side of the identified high-performance-cost boundary and a second data access command to write data blocks associated with a second opposite side of the identified high-performance-cost, boundary.

16. The one or more computer-readable storage media method of claim 14, wherein the execution order is determined based on positions of targeted physical blocks, the execution order mitigating total seek times observed during execution of a plurality of commands in the queued sequence.

17. The one or more computer-readable storage media method of claim 14, wherein the execution order is determined based on write/read settings associated with targeted physical blocks, the execution order mitigating a number of interlayer seeks.

* * * * *